No. 804,482. PATENTED NOV. 14, 1905.
A. G. LEGGE.
CRIMPING MACHINE.
APPLICATION FILED MAY 15, 1905.
2 SHEETS—SHEET 1.
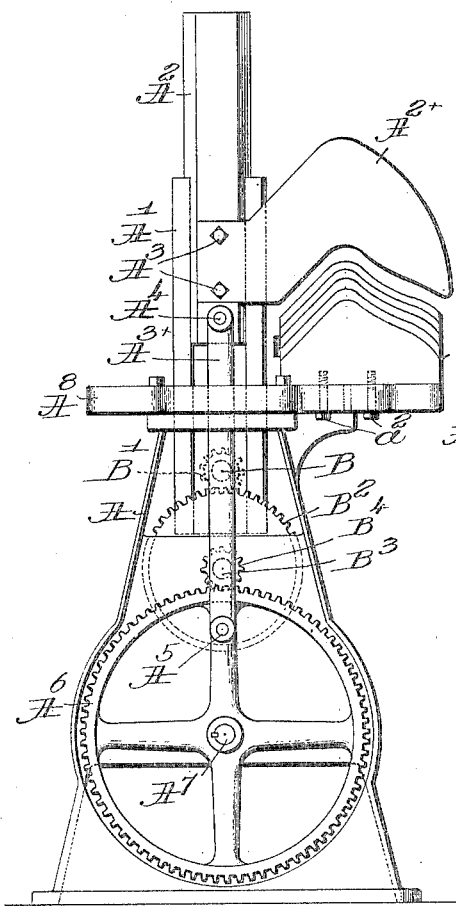
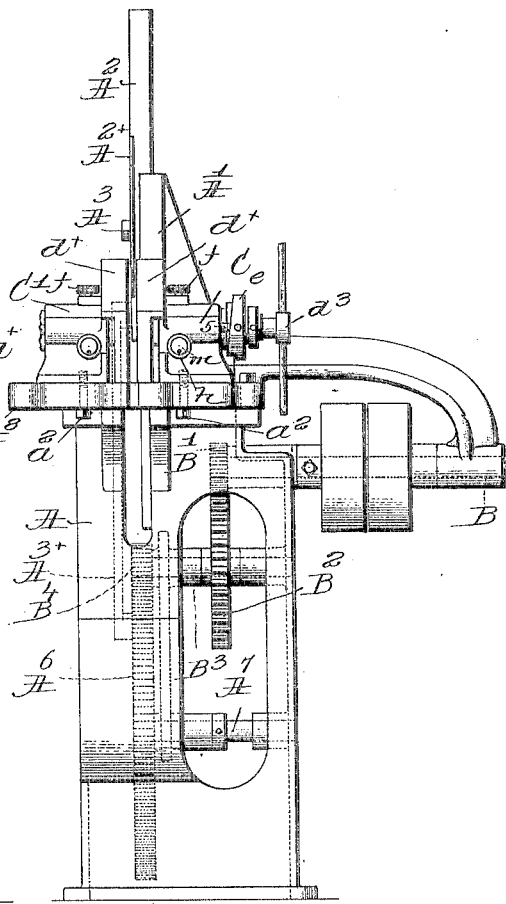
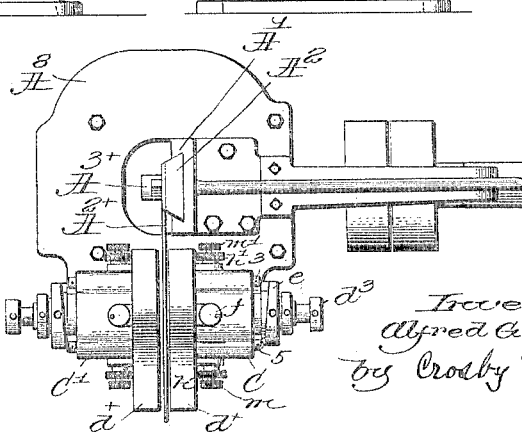
Witnesses:
Fred. S. Greenleaf.
W. C. Lunsford.
Inventor.
Alfred G. Legge,
by Crosby & Gregory
attys.

No. 804,482. PATENTED NOV. 14, 1905.
A. G. LEGGE.
CRIMPING MACHINE.
APPLICATION FILED MAY 15, 1905.
2 SHEETS—SHEET 2.
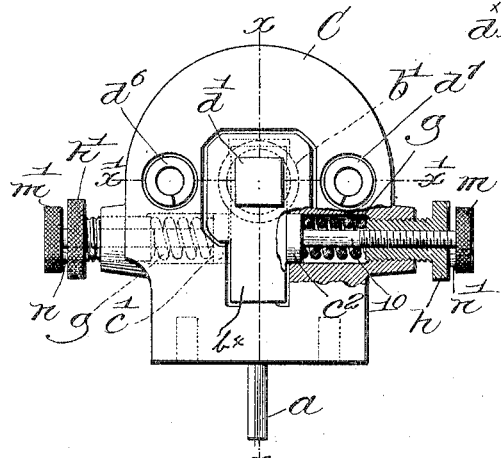
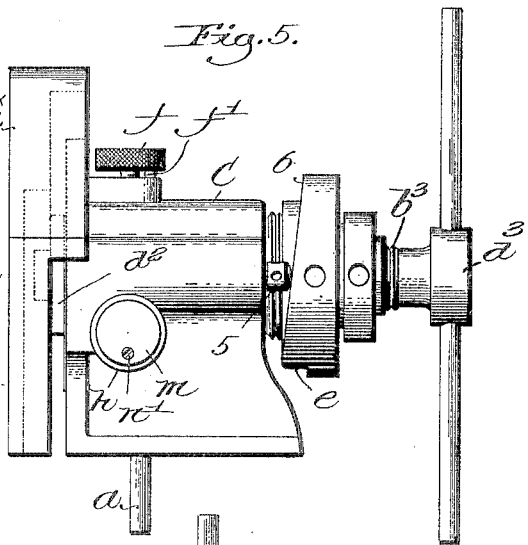
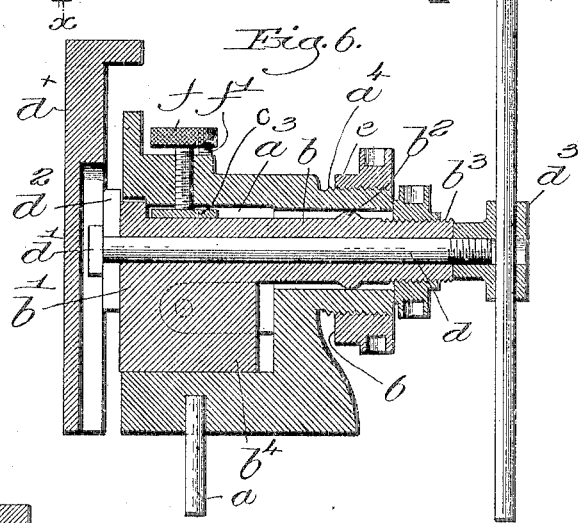
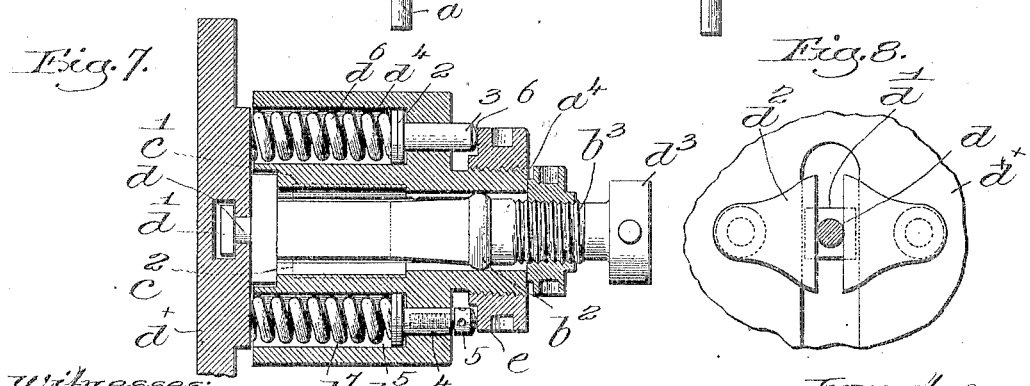

UNITED STATES PATENT OFFICE.

ALFRED G. LEGGE, OF BROCKTON, MASSACHUSETTS, ASSIGNOR TO LOCKETT CRIMPING MACHINE COMPANY, OF BROCKTON, MASSACHUSETTS, A FIRM.

CRIMPING-MACHINE.

No. 804,482.  Specification of Letters Patent.  Patented Nov. 14, 1905.

Application filed May 15, 1905. Serial No. 260,484.

*To all whom it may concern:*

Be it known that I, ALFRED G. LEGGE, a citizen of the United States, residing at Brockton, in the county of Plymouth and State of Massachusetts, have invented an Improvement in Crimping-Machines, of which the following description, in connection with the accompanying drawings, is a specification, like characters on the drawings representing like parts.

This invention has for its object to improve the class of crimping-machine illustrated in United States Patent No. 485,204, dated November 1, 1892. In the patent referred to the crimping-jaws had merely a right-line movement one with relation to the other, and frequently the strain on the stock as the latter entered the space between the jaws cracked and stretched the stock unevenly. In my invention I have devised means whereby the jaws besides yielding in a right line may also yield substantially universally, and thereby the stock is stretched substantially uniformly at all points, which results in better crimping, and provision is made that the jaws come gradually to their full bearing on the stock instead of abruptly, or, in other words, the jaws yield easier to the stock as the same contacts with the jaws preparatory to being passed between the jaws than after the stock is entered between the jaws. In the patent referred to owing to the jaws moving only in a right line the thicker portions of the stock were subjected between the parallel faces of the jaws to greater pressure than thinner portions of the stock, and as a result the thinner portion of the stock failed to be stretched properly and was left wrinkled. In my invention to insure equal pressure on the stock from one to the other end of the jaws and to avoid wrinkles in the stock I have provided means whereby the faces of jaws contacting with the stock on the form-plate may assume positions out of parallelism more or less so, according to the requirements of the stock being crimped. I have also devised means whereby the jaws may be readily clamped and have provided novel means whereby the pressure of the springs acting on the backs of the jaws may be regulated.

Figure 1 in side elevation represents a crimping-machine embodying my invention, one of the heads being removed and the form-plate elevated. Fig. 2 is a right-hand side elevation of the machine shown in Fig. 1, but with both heads in position. Fig. 3 is a top or plan view of Fig. 2. Fig. 4 represents a face view of the head, partly in section, with the jaw removed; Fig. 5, a side elevation of one of the heads removed from the machine together with its jaw. Fig. 6 is a vertical section through Fig. 5 in the line $x$, Fig. 4. Fig. 7 is a horizontal section in the line $x'$, Fig. 4, of the head with its attached jaw; and Fig. 8 is a detail showing the hub at the inner side of the jaw with the head of the clamping device in engagement therewith.

In the drawings, A represents a framework having a vertical guide member $A'$, fixed securely by bolts and extended upwardly. The member $A'$ presents a dovetailed groove that receives a slide $A^2$, recessed at its face for the reception of the shank of the form-plate $A^{2\times}$, the latter being connected to said slide by suitable screws $A^3$. The slide is reciprocated vertically in the guide member by, as shown, a link $A^{3\times}$, embracing a stud $A^4$ and connected at its other end with a crank-pin $A^5$, extended outwardly from a toothed wheel $A^6$, fixed to a shaft $A^7$, having suitable bearings in the framework A. This shaft is rotated, as shown, by or through a power-driven shaft B, having a pinion $B'$, that engages a toothed gear $B^2$, fast on an intermediate shaft $B^3$, provided with a pinion $B^4$, that engages and drives the toothed wheel $A^6$. The wheel $A^6$ may, however, be driven by any suitable gearing. The framework presents a slotted bed $A^8$, and said bed at opposite sides of its slot sustains duplicate crimping-heads C $C'$, both alike, and hence it is necessary to describe but one of them particularly. Each head has a depending stud $a$, that fits a hole in the bed, and each head is so located and fixed to the bed that the faces of the heads are substantially exactly parallel. Each head is secured or fixed to the bed by suitable bolts $a^2$, preferably two, that are extended upwardly through holes in the bed and enter threaded holes in the head. Each head has a chamber $a^3$ in its face, and each head at its rear side has a boss $a^4$, shown as threaded externally and bored to form a bearing for the shank $b$ of the plunger $b'$, said shank having an annular projection $b^2$, that substantially fits the interior of the hole of said boss, and the end of said shank is threaded at $b^3$.

The shape of the head of the plunger is shown best in Figs. 4 and 6, it having at its under side a tongue $b^4$, and the top and both sides of the head are so shaped as to leave between the exterior of the head of the plunger and the interior of the chamber in the head C a sufficient space for the reception of gibs $c$ $c'$ $c^2$, the gib $c$ resting on the upper side of the head of the plunger, while the gibs $c'$ $c^2$ occupy positions at the opposite sides of said plunger-head, as shown in Fig. 4.

The plunger and its shank are bored to receive a jaw-holding device $d$, shown as a bolt having a head $d'$ shaped to be embraced by a slot in the hub $d^2$ of the jaw $d^\times$, and by turning the nut $d^3$ onto the threaded end of said bolt the jaw is clamped rigidly to the face of the plunger.

Each head C and C' is provided with parallel holes $d^4$ $d^5$ to receive strong steel springs $d^6$ $d^7$. The inner end of the spring $d^6$ abuts a washer 2, that in turn abuts the head of a pin 3, while the shank of the pin 4 is threaded and provided with an adjusting device 5, shown as a threaded stud.

The threaded part of the boss $a^2$ receives a cam-nut $e$, shown as having a series of holes for the reception of a suitable tool, by which to turn said cam-nut as may be desired and cause its two like cam-faces 6 to act one against the end of the pin 3 and the other against the head of the adjustable stud 4, said cam as it is turned moving said pin 3 and stud 4 and determining the effective pressure of said springs against the rear side of each jaw at opposite sides of the head of the plunger. It is essential for the best action of the jaws that the pressure of the springs $d^6$ and $d^7$ are just alike or are equalized, and as it is almost impossible to get springs of just the same strength I have provided one of the pins with an adjusting device, which may be turned in one or the other direction, and thus insure equal pressure of the springs on the jaws.

The threaded part of the shank of the plunger receives a threaded nut that bears against the end of the boss $a^4$, and by turning this nut the face of the plunger with relation to the face of the head is determined.

It will be seen that the projection $b^2$ of the plunger contacts in such manner with the wall of the passage in the boss $a^4$ that the head of said plunger may be raised or moved laterally in either direction, this providing for a substantially universal adjustment or movement of the plunger in adapting the position of the plunger carrying the jaw to the stock being acted upon.

It will be understood that the stock to be crimped will be laid on the upper sides of the top flange of the jaws and that the stock will be acted upon by the descending form-plate and carried between the jaws, the form-plate having a sufficient extent of movement to carry the stock completely below the jaws, where it is discharged from the form-plate. Now the top edges of the jaws are at a considerable distance from the longitudinal center of the bolt $d$, and owing to the projection $b^2$ described it will be seen that as soon as the form-plate meets the stock sustained on the top of the jaws the pressure of the stock on the jaws has a tendency to spread, as it were, the jaws at their upper ends, causing the head of the plunger to rise, and in this way the space between the lips of the jaws is momentarily increased to thus permit the form-plate to embrace the stock between the jaws easily before the full force of the jaws is exerted on the stock. That this relief of pressure may be adjusted in extent to suit the requirements of the stock, I have provided the gib $c$ and have placed it under the control of an adjusting device $f$, (shown as a screw,) and to lock said screw in the exact position in which it may be adjusted I have provided the head of said screw with a locking device, (shown as a screw $f'$,) that may be turned whenever the screw $f$ has been rotated sufficiently to effect the adjustments called for. By permitting a slight separation of the upper part of the jaws just as the stock is being forced therebetween I avoid breaking or marring tender stock of which many shoes are made.

The stock being crimped varies in length according to the style of the shoe, and usually all leather varies in thickness, and consequently I have provided means whereby the face of the jaws may assume a position out of parallelism with relation to each other as the thickness of the stock at each side of the form-plate varies in its length.

It will be understood that the pressure of the springs $d^6$ and $d^7$ are and will be substantially uniform as the stock is being forced between the jaws.

In some classes of work—as, for instance, so-called "seamless vamps," where a heel part of a vamp to be crimped is of considerable length—provision must be made to insure a proper amount of pressure on the vamp part of the boot or shoe and to avoid such pressure as might tear, injure, or distort the heel part. That this class of work may be cared for, I have devised the gibs $c'$ and $c^2$, $c'$ being supposed to be in position to contact with that side of the head of the plunger where the operative stands, or the front of the machine, while the gib $c^2$ is located at the rear side of the head and plunger. These gibs have each a shank 10 extended therefrom through a spring $g$ or $g'$, located in suitable pockets formed in the head C. The outer ends of the pockets are threaded to receive spring-controlled screw-plugs $h$ $h'$, that act, respectively, against the outer ends of the springs $g$ $g'$ and control their effective strength, and to limit the extent of the movement of said gibs so backed up by said springs I have provided like stops $m$ $m'$ (shown as headed screws) and have provided the head of each screw with a locking device $n$ or $n'$, which is also shown as screws. When crimping vamps for other than seamless work, I prefer to and usually do so adjust said spring-controllers and stops that the plunger may be spring-sustained as to a limited amount of lateral movement in either direction, so that the jaws may assume a position slightly out of parallelism, and thus provide for differences in thickness of stock. When, however, the work is of the seamless variety, I may turn the stop $m$ to thus prevent any lateral movement of the plunger toward the rear side of the head, and so place the stop $m$ and the spring-controller $n$ as to provide for more or less movement of the plunger toward the front of the machine, and in this way I may relieve the pressure of the rear ends of the jaws on the stock which it is not desired to stretch. Now ordinarily the vamp part of the class of shoe referred to will be located at the front of the machine, and it is the vamp that needs to be crimped and not the heel part, and consequently the gibs are adjusted as above described.

Having described my invention, what I claim as new, and desire to secure by Letters Patent, is—

1. In a crimping-machine, a plurality of heads each having a plunger provided with a jaw, and means for moving said plungers in said heads both longitudinally and vertically.

2. In a crimping-machine, a plurality of heads having each a plunger provided with a jaw, and means for moving said plungers both longitudinally and vertically in said heads, and means to control the extent of vertical movement of the plungers in said head.

3. In a crimping-machine, a head chambered for the reception of the head of a plunger and having a boss provided with an opening communicating with said chamber, a plunger having a head to enter loosely the chamber of the head and having a hollow shank provided with a projection, said shank being extended through the passage-way of said boss, the shank being free to be tipped in said passage-way as the position of the head of the plunger is changed in the chamber of the head.

4. In a crimping-machine, a head having parallel passages, springs in said passages, a plunger, a jaw, means to confine said jaw to said plunger, a cam-nut, and means intermediate the cam-faces of said cam-nut and said springs whereby the strength of the springs may be equalized.

5. In a crimping-machine, a head, a plunger movably sustained in said head, springs at opposite sides of the head of said plunger, and spring-controllers coacting with said springs to adjust their tension.

6. In a crimping-machine, a head having a chamber, a plunger having a shank and entered loosely in said chamber, and means to control the extent of lateral movement of said plunger in the recess of said head in one or the other direction.

7. In a crimping-machine, a chambered head, a plunger mounted in said head and free to be moved laterally as well as longitudinally, combined with gibs having shanks, springs acting on said gibs, spring-controllers to control the effective pressure of said springs, and stops to determine the extent of lateral movement of said plunger in one or the other direction.

8. In a crimping-machine, a chambered head, a plunger loosely mounted in said head, and a projection to permit said plunger to not only rise but to move laterally, combined with gibs, and means to control their positions in the chamber of said head to thereby limit both the vertical and lateral movement of the plunger in the head.

In testimony whereof I have signed my name to this specification in the presence of two subscribing witnesses.

ALFRED G. LEGGE.

Witnesses:
GEO. W. GREGORY,
MARGARET A. DUNN.